Jan. 8, 1935.　　　　　C. STEENSTRUP　　　　1,987,422
METHOD OF MAKING HEAT EXCHANGE APPARATUS
Filed June 14, 1934
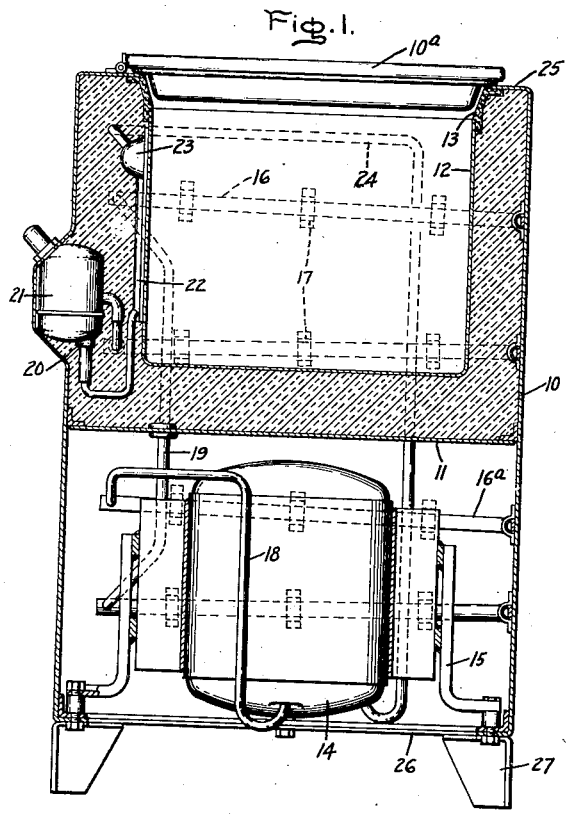
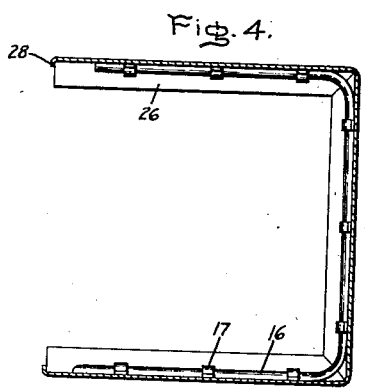
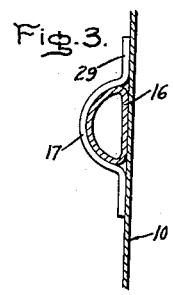
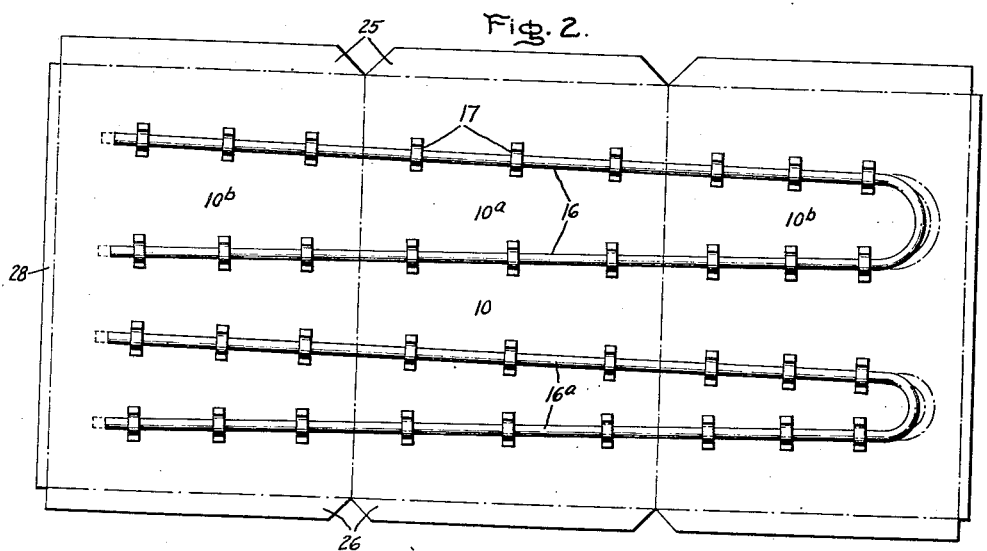
Inventor:
Christian Steenstrup,
by Harry E. Dunham
His Attorney.

Patented Jan. 8, 1935

1,987,422

UNITED STATES PATENT OFFICE 1,987,422

METHOD OF MAKING HEAT EXCHANGE APPARATUS

Christian Steenstrup, Schenectady, N. Y., assignor to General Electric Company, a corporation of New York Application June 14, 1934, Serial No. 730,590

6 Claims. (Cl. 29—157.3)

My invention relates to methods for making heat exchange apparatus for refrigerating machines and the like.

It is sometimes desirable to secure a heat exchange device, such as a condenser for a refrigerating machine, to the walls forming the cabinet within which the machine is housed, as described and claimed in my application Serial No. 554,623, filed August 3, 1931, and assigned to the General Electric Company, assignee of my present application. These cabinets are commonly made of inner and outer sheet metal walls spaced apart with heat insulating material therebetween. In order to obtain sufficient heat exchange surface a condenser comprising a conduit is arranged on two or more side walls of the cabinet, and it is, therefore, necessary that the condenser conduit be bent to conform to the shape of the cabinet. In order to expedite the manufacturing operation it is preferable that the condenser and metal sheets which are to form the walls of the cabinet be secured together while flat, prior to bending the cabinet walls into shape. However, when the conduit is secured to the walls for this operation there is danger when the walls are bent as required at the corners of the cabinet that the conduit will be flattened and the passage therethrough be restricted. Accordingly it is an object of my invention to provide an improved method for securing and forming a heat exchange conduit on the walls of a cabinet or the like.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a sectional side elevation of a refrigerating machine provided with a condenser constructed in accordance with my invention; Fig. 2 is a view of a condenser conduit and the sheet metal walls of a refrigerator cabinet prior to bending; Fig. 3 is an enlarged cross-section of the conduit showing one of the cleats for securing the conduit to the cabinet wall, and Fig. 4 is a sectional plan view of the condenser and walls shown in Fig. 2 after bending.

Referring now to Fig. 1, I have shown a refrigerator cabinet comprising an outer metal wall 10 and having a partition 11 dividing the space within the wall 10 into an upper and lower compartment. Within the upper compartment is an inner wall 12 spaced from the wall 10 and from the partition 11 and secured to the wall 10 at the top thereof by a strip of heat insulating material 13, the space between the walls 10 and 12 being filled with heat insulating material. An insulated cover 10a is provided to close the chamber or compartment formed by the inner wall 12. In the lower section of the cabinet is arranged a casing 14 secured to the wall 10 on brackets 15. A condenser, comprising upper and lower conduits 16 and 16a respectively, is secured to the inner surface of the outer wall 10 on three sides of the cabinet by a plurality of cleats or straps 17.

Gaseous refrigerant is compressed by a compressor arranged within the casing 14 and flows therefrom through a conduit 18 to the conduit 16a, thence through a connection 19 to the conduit 16. The compressed refrigerant is cooled and liquefied by air circulating over the outer wall 10 of the cabinet, as the conduits 16 and 16a are in close thermal contact with the outer wall of the cabinet. The liquid refrigerant flows from the condenser through a connection 20 to a reservoir or float valve chamber 21 from which it passes in regulated quantities to an evaporator 22 arranged on the inner wall 12 of the refrigerator cabinet. The liquid refrigerant is vaporized in the evaporator 22, collects in a header 23, and returns through a conduit 24 to the compressor within the casing 14.

In accordance with my invention the condenser is secured to a flat sheet metal, and the sheet with the condenser thereon is bent to form the side walls of the cabinet. In carrying out this method of manufacture I first stamp a flat sheet as shown in Fig. 2, adapted to form three sides of the outer wall 10 of the refrigerator cabinet. Dotted lines in the figure dividing the sheet into a plurality of sections indicate the lines along which the sheet is to be bent in forming the three sides of the refrigerator cabinet and the flanges at the edges of the sides. The sheet comprises three main sections the middle section 10a of which is to form the front wall of the refrigerator cabinet and the outer sections 10b of which are to form the side walls. At the top of each of these sections is provided a portion 25 which when bent at right angles to the section forms the top of the cabinet wall surrounding the door opening. At the bottom of each section is provided a portion 26 which is to be bent at right angles to the sections to form a flange at the bottom of the wall to which supports 15 and a plurality of legs 27 are secured. Narrow portions 28 at the sides of the outer sections of the wall sheets are provided in order to secure the rear wall to the side of the cabinet. When the sheet has been cut in the desired shape and notched, the conduits 16 and 16a are secured thereto by the cleats or straps 17.

With particular reference to Fig. 3 the conduits 16 and 16a are formed with a flat side which provides a considerable area in contact with the wall 10. Each cleat 17 conforms to the rounded portion of the conduits 16 and 16a and is provided with flat end portions 29 which fit against the wall 10 and are welded, or otherwise suitably secured thereto. Conduits 16 and 16a are so mounted that they may slide under the cleat 17 during subsequent bending of the sheet. The cleats are sufficiently tight to maintain a good heat exchange contact between the conduits and the walls. The cleats adjacent the lines along which the sheet is to be bent are spaced from the line of bending sufficiently to permit the conduit to bend with a relatively long radius of curvature as compared with the radius of curvature of the bend in the sheet. The sheet is next bent along the lines indicated. During the bending operation the conduit is forced to slide under the cleats on the two side sections of the sheet as it is bent with a greater radius of curvature than the sheet. It is desirable to prevent any sliding of the middle section in order to obtain a uniform bend and, for this reason, the middle section of the conduit may be clamped to the sheet to prevent relative movement therebetween during the bending operation. Since the conduit is allowed to slide outwardly under the cleats on the side sections of the sheet the bend in the conduit is formed with the radius of curvature considerably longer than that of the bend in the sheet and sufficiently long to prevent the formation of a constriction in the conduit due to too sharp bending therein. The position which the conduit will assume after it is bent is indicated in dotted lines in Fig. 2, and in Fig. 4 is shown a plan view of the conduit walls after bending. It is readily apparent that the conduit is retained in close contact with the sheet throughout the bending operation, and that the entire wall is effectively utilized as a heat transferring surface.

While I have shown and described my invention in connection with a compression refrigerating machine for household use, other applications will readily be apparent to those skilled in the art, and I do not desire my invention to be limited to the construction shown and described, and I intend in the appended claims to cover all modifications within the spirit and scope of my invention.

What I claim as new and desire to secure by Letters Patent of the United States, is:

1. The method of securing a conduit to a plurality of the walls of a metal cabinet or similar structure which comprises placing the conduit on a metal sheet of which said walls are to be formed, frictionally securing said conduit to said sheet, and bending the assembled sheet and conduit and sliding the conduit with respect to one of said walls to bend the conduit at the bend in said sheet with a radius of curvature substantially greater than that of the bend in said sheet.

2. The method of securing a conduit to a plurality of the walls of a metal cabinet or similar structure which comprises placing the conduit on a flat metal sheet of which said walls are to be formed, securing said conduit to said sheet by metal straps frictionally engaging said conduit and secured to said sheet, bending said sheet to form said walls and sliding the conduit with respect to one of said walls to bend the conduit at the bends in said sheet with a radius of curvature substantially greater than that of the bend in said sheet.

3. The method of securing a conduit to a plurality of the walls of a metal cabinet or similar structure which comprises forming the conduit with one side thereof flattened, placing said conduit on a flat metal sheet of which said walls are formed and with the flat side of said conduit engaging said sheet, securing said conduit to said sheet by metal straps frictionally engaging said conduit and secured to said sheet, and bending said sheet to form said walls and sliding said conduit with respect to one of said walls to bend the conduit at the bend in said sheet with a radius of curvature substantially greater than that of the bend in said sheet.

4. The method of securing a conduit to a plurality of the walls of a metal cabinet or similar structure which comprises placing the conduit on a flat metal sheet of which said walls are to be formed, placing a plurality of metal straps at intervals along said conduit, welding said straps to said sheet at the ends of said straps to frictionally secure said conduit to said sheet, and bending said sheet to form said walls and sliding said conduit with respect to one of said walls to bend the conduit at the bend in said sheet with a radius of curvature substantially greater than that of the bend in said sheet.

5. The method of securing a conduit to a plurality of the walls of a cabinet or similar structure which comprises placing the conduit on a metal sheet of which said walls are to be formed, securing said conduit to said sheet, and bending the assembled sheet and conduit and sliding the conduit with respect to one of said walls while forming the bend in said conduit.

6. The method of securing a conduit to a plurality of the walls of a cabinet or similar structure which comprises placing the conduit on a metal sheet of which said walls are to be formed, securing said conduit against movement with respect to one portion of said sheet which is to form one of said walls, and bending the assembled sheet and conduit and sliding the conduit with respect to another of said walls to bend the conduit at the bend in said sheet.

CHRISTIAN STEENSTRUP.